(12) United States Patent
Searfass

(10) Patent No.: US 8,038,479 B2
(45) Date of Patent: Oct. 18, 2011

(54) CARBON NANOTUBE-BASED ELECTRICAL CONNECTORS

(75) Inventor: Michael T. Searfass, Tomball, TX (US)

(73) Assignee: NanoRidge Materials, Houston, TX (US)

( * ) Notice: Subject to any disclaimer, the term of this patent is extended or adjusted under 35 U.S.C. 154(b) by 106 days.

(21) Appl. No.: 12/315,716

(22) Filed: Dec. 5, 2008

(65) Prior Publication Data
US 2010/0144205 A1 Jun. 10, 2010

(51) Int. Cl.
*H01R 9/03* (2006.01)
(52) U.S. Cl. .................................. 439/658; 977/932
(58) Field of Classification Search .............. 524/495; 439/658
See application file for complete search history.

(56) References Cited

U.S. PATENT DOCUMENTS

| | | | |
|---|---|---|---|
| 6,146,196 | A | 11/2000 | Burger |
| 6,626,684 | B1 * | 9/2003 | Stickler et al. ............ 439/87 |
| 6,683,783 | B1 | 1/2004 | Smalley |
| 6,896,864 | B2 * | 5/2005 | Clarke ................ 423/447.1 |
| 7,256,345 | B2 * | 8/2007 | Inoue ...................... 174/36 |
| 7,405,363 | B2 * | 7/2008 | Inoue ..................... 174/255 |
| 7,470,862 | B2 * | 12/2008 | Lin et al. ............... 174/117 R |
| 7,549,885 | B1 * | 6/2009 | Oh et al. ................. 439/316 |
| 7,717,718 | B2 * | 5/2010 | Davoine et al. ............ 439/74 |
| 2003/0219622 | A1 * | 11/2003 | Niebauer ................ 428/663 |
| 2005/0285264 | A1 * | 12/2005 | Burdick et al. ............. 257/724 |
| 2006/0094989 | A1 * | 5/2006 | Scott et al. .................. 601/5 |
| 2006/0283616 | A1 * | 12/2006 | Onoue ....................... 174/36 |
| 2007/0128905 | A1 * | 6/2007 | Speakman ................ 439/161 |
| 2007/0161263 | A1 * | 7/2007 | Meisner .................... 439/48 |
| 2008/0234424 | A1 * | 9/2008 | Lee et al. ................. 524/495 |
| 2008/0251270 | A1 | 10/2008 | Lee |
| 2009/0197484 | A1 * | 8/2009 | Chen et al. ............... 439/884 |
| 2010/0059273 | A1 * | 3/2010 | Montbach et al. ......... 174/70 R |

FOREIGN PATENT DOCUMENTS

| | | |
|---|---|---|
| WO | 2005/109581 | 11/2005 |
| WO | 2006/060476 | 6/2006 |
| WO | 2008/041965 | 4/2008 |

OTHER PUBLICATIONS

International Search Report and Written Opinion for PCT/US2008/013428 mailed Aug. 20, 2009.
Wildgoose, et al., "Metal Nanoparticles and Related Materials Supported on Carbon Nanotubes: Methods and Applications", Small, 2:2006, pp. 182-193.

* cited by examiner

*Primary Examiner* — Briggitte R Hammond
(74) *Attorney, Agent, or Firm* — Winstead PC

(57) ABSTRACT

Electrical connectors comprising carbon nanotubes, at least one polymer, and a metallic electrical conductor are described. The carbon nanotubes are dispersed in the polymer to create an electrically-conducting polymer dispersion. The metallic electrical conductor contacts the electrically-conducting polymer dispersion to form the electrical connector. The electrical connectors include standard electrical connections for incorporation into standard electrical circuit applications. Methods to prepare the electrical connectors are described.

15 Claims, 9 Drawing Sheets

Fig. 6

NanoCable Design Calculations
Example Embodiment
Prepared By:     M. T. Searfass

NanoCable Specification

| | |
|---|---|
| Voltage | 120 V |
| Current | 30 A |
| Power | 3600 W |
| Length | 100.00 FT (3048 cm) |
| NT Concentration | 5.00 Wt% |

Polymer Specification

| | |
|---|---|
| Type | Urethane/Methacrylate |
| Density | 1.05 g/cm$^3$ |

Nanotube Specifications

| | |
|---|---|
| Length | 1 $\mu$m |
| Diameter | 1.375 nm |
| Atomic density | 66 C/nm Length |
| NT weight | 1.3168E-18 g |
| Structural density | 0.89 g/cm$^3$ |
| Power density | 5 $\mu$W/$\mu$m |
| Power capacity | 5 $\mu$W/NT |
| Contact area | 1375 nm$^2$/NT |
| CSA | 1.48E-14 cm$^2$/NT |

NT/Cu Interface

| | |
|---|---|
| Mm. No. of NT's | 7.20E+08 |
| Mm. NT area | 0.0099 cm$^2$ |
| Misalignment fraction | 0.33 |
| Required No. of NT's | 1.08E+09 |
| Required NT area | 0.01484 cm$^2$ |
| NT current density | 3030 A/cm$^2$ |
| Volume concentration | 5.87 Vol. % |
| Mm. Cu area | 0.253 cm$^2$ |
| Cu current density | 118.57 A/cm$^2$ |

Conductor Dimensions

| | |
|---|---|
| Mm. CSA | 0.253 cm$^2$ |
| Mm. D | 0.568 cm |
| Number of Cu pins | 2 |
| Cu pin SA | 0.127 cm$^2$ |
| Cu penetration length | 1 cm |
| Cu pin diameter | 0.040 cm |
| AWG | 28 |
| Total Cu pin CSA | 0.00255 cm$^2$ |
| Total conductor CSA | 0.256 cm$^2$ |
| Pin/conductor CSA | 1.00 % |
| Total conductor D | 0.570 cm |

Check of Conductor D Using Derived Percolation Threshold Equation

| | |
|---|---|
| Resistance | 4.00 $\Omega$ |
| Resistivity | 3.35E-04 $\Omega$-cm |
| Conductivity | 2.98E+03 S/cm |
| Percolation Threshold | 0.005 Wt. % SWNT |
| NT Concentration | 1179.030 Wt. % SWNT |

Fig. 7

| NanoCable Design Calculations | |
|---|---|
| Example Embodiment | |
| Prepared By: | M. T. Searfass |
| NanoCable Specification | |
| Voltage | 110 V |
| Current | 0.2 A |
| Power | 22 W |
| Length | 7.62 FT (7.62 cm) |
| NT Concentration | 4.915 Wt% |
| Polymer Specification | |
| Type | Urethane/Methacrylate |
| Density | 1.05 g/cm³ |
| Nanotube Specifications | |
| Length | 1 μm |
| Diameter | 1.375 nm |
| Atomic density | 66 C/nm Length |
| NT weight | 1.3168E-18 g |
| Structural density | 0.89 g/ cm³ |
| Power density | 5 μW/μm |
| Power capacity | 5 μW/NT |
| Contact area | 1375 nm²/NT |
| CSA | 1.48E-14 cm²/NT |
| NT/Cu Interface | |
| Mm. No. of NT's | 4.40E+06 |
| Mm. NT area | 0.0000605 cm² |
| Misalignment fraction | 0.99 |
| Required No. of NT's | 3.67e+08 |
| Required NT area | 0.00504 cm² |
| NT current density | 3306 A/cm² |
| Volume concentration | 5.77 Vol. % |
| Mm. Cu area | 0.087 cm² |
| Cu current density | 2.29 A/ cm² |
| Conductor Dimensions | |
| Mm. CSA | 0.087 cm² |
| Mm. D | 0.334 cm |
| Number of Cu pins | 1 |
| Cu pin SA | 0.087 cm² |
| Cu penetration length | 0.635 cm |
| Cu pin diameter | 0.044cm |
| AWG | 26 |
| Total Cu pin CSA | 0.00151 cm² |
| Total conductor CSA | 0.089 cm² |
| Pin/conductor CSA | 1.70 % |
| Total conductor D | 0.336 cm |
| Check of Conductor D Using Derived Percolation Threshold Equation | |
| Resistance | 550.00 Ω |
| Resistivity | 6.42E+00 Ω-cm |
| Conductivity | 1.56E-01 S/cm |
| Percolation Threshold | 0.005 Wt. % SWNT |
| NT Concentration | 4.915 Wt. % SWNT |

| VOLTAGE (V) | CURRENT (A) | POWER (KW) | CONDUCTOR DIAMETER (CM) | NO. OF PINS | PIN DIAMETER (CM) | PIN GAUGE (AWG) | PENETRATION DEPTH (CM) | PIN/CONDUCTOR CSA (%) |
|---|---|---|---|---|---|---|---|---|
| 120 | 5 | 0.6 | 0.233 | 1 | 0.022 | 32 | 0.60 | 0.92 |
| 120 | 7.5 | 0.9 | 0.285 | 1 | 0.025 | 32 | 0.80 | 0.78 |
| 120 | 15 | 1.8 | 0.403 | 2 | 0.025 | 32 | 0.80 | 0.78 |
| 120 | 30 | 3.6 | 0.570 | 2 | 0.040 | 28 | 1.00 | 1.00 |
| 120 | 60 | 7.2 | 0.807 | 4 | 0.040 | 28 | 1.00 | 1.00 |
| 120 | 60 | 14.4 | 1.141 | 8 | 0.040 | 28 | 1.00 | 1.00 |
| 240 | 120 | 28.8 | 1.613 | 4 | 0.081 | 22 | 2.00 | 1.00 |
| 240 | 240 | 57.6 | 2.282 | 8 | 0.081 | 22 | 2.00 | 1.00 |
| 480 | 240 | 115.2 | 3.218 | 10 | 0.086 | 20 | 3.00 | 0.71 |
| 480 | 480 | 230.4 | 4.561 | 12 | 0.123 | 18 | 3.50 | 0.87 |
| 480 | 960 | 460.8 | 6.454 | 16 | 0.081 | 16 | 4.00 | 1.00 |

*Fig. 8*

CARBON NANOTUBE-BASED ELECTRICAL CONNECTORS

STATEMENT REGARDING FEDERALLY SPONSORED RESEARCH

The U.S. Government has a paid-up license in this technology and the right in limited circumstances to require licensure to others on reasonable terms as provided for by the terms of award #70NANB7H7043 by the Department of Commerce, National Institute of Standards and Technology—Advanced Technology Program.

BACKGROUND

Modern power cables come in a variety of sizes, materials, and types, each cable being particularly adapted to its end use. Cables are constructed from three major design components: conductors, insulations, and protective layers. The construction details of individual cables vary according to their intended application. A variety of connections are available for power cables, such as male connections (plugs), female connections (sockets), twist-on connections, and alligator clips.

Carbon nanotubes (CNTs) have been proposed to replace metal-based conductors in certain applications due to their high conductivity, strength, and light weight. Carbon nanotubes are known to display a range of electric properties. For example, single-wall carbon nanotubes (SWNTs) can be metallic conductors, semi-metallic conductors, semiconductors, or insulators depending on their chirality. Carbon nanotube/polymer composites offer significant mechanical strength, as well as electrical conductivity when conducting carbon nanotubes are blended in the polymer. Orientation of the carbon nanotubes in the polymer composite can influence both the mechanical and electrical properties of the composite material. Despite the potential benefits offered by carbon nanotubes, commercial success in electrical and mechanical applications utilizing these species has not yet been realized.

In view of the foregoing, electrical connectors and devices based on carbon nanotubes represent a significant unmet commercial need. Further, the electrical connectors and devices should be easily constructed and be simply integrated into existing electrical applications. For example, lightweight, highly-conducting electrical cables based on carbon nanotubes dispersed in a polymer and formed into a cable having conventional cable connections would be of particular commercial interest.

SUMMARY

In various embodiments, electrical connectors are described. The electrical connectors comprise at least one polymer, carbon nanotubes, and an electrical conductor. The carbon nanotubes are dispersed in the at least one polymer to form an electrically-conducting carbon nanotube/polymer dispersion. The electrical conductor comprises two electrical connection points. The electrical conductor comprises at least one metal. A first of the two electrical connection points contacts the carbon nanotube/polymer dispersion. A second of the two electrical connection points comprises a standard electrical connection.

In other various embodiments, methods for constructing electrical connectors are described. The methods include preparing a dispersion of carbon nanotubes in a polymer, preparing an electrical conductor comprising at least one metal, and connecting the electrical conductor and the dispersion. The carbon nanotubes in the dispersion are at least partially aligned. The electrical conductor includes a first electrical connection point and a second electrical connection point. The first electrical connection point comprises a plurality of electrically-conducting pins. The second electrical connection point comprises a standard electrical connection. Connecting comprises inserting the plurality of electrically-conducting pins into the dispersion.

In still other various embodiments, methods for transmitting electric current are described. The methods comprise providing an electrical connector as described herein and connecting the electrical connector to a power source.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiment of the disclosure, wherein:

FIG. 6 illustrates an exemplary spreadsheet used for inputting and calculating various electrical connector construction parameters. The calculated carbon nanotube percentage does not represent physical reality as calculated based on the input parameters;

FIG. 7 illustrates an exemplary spreadsheet used for inputting and calculating various electrical connector construction parameters. The calculated carbon nanotube percentage represents a physically realistic carbon nanotube percentage as determined based on the input parameters;

FIG. 8 illustrates various electrical connector construction parameters for some common voltages and currents applicable to AC and DC power.

DETAILED DESCRIPTION

Figure 1A:
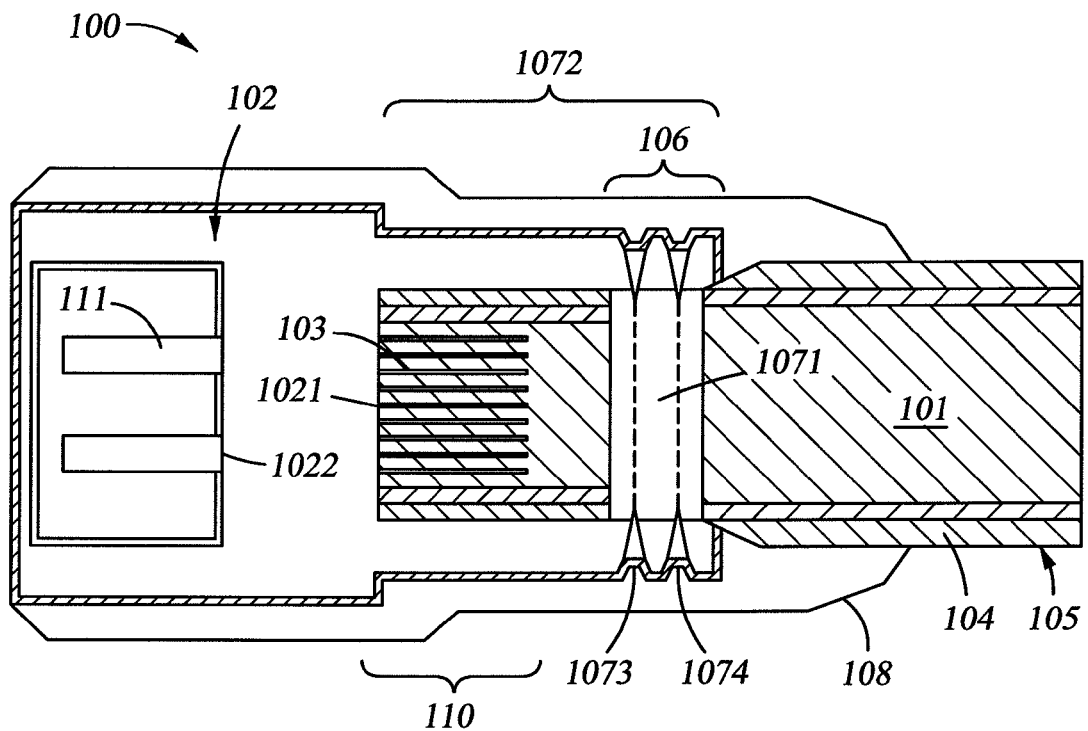
FIG. 1 illustrates an embodiment of an electrical connector comprising carbon nanotubes dispersed in a polymer and having standard electrical connections.

In the following description, certain details are set forth such as specific quantities, sizes, etc. so as to provide a thorough understanding of the various embodiments disclosed herein. However, it will be obvious to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

"Contact," as defined herein, refers to, for example, a condition where two or more bodies touch one another. In some embodiments, contact may comprise surface contact between the two or more bodies. In some embodiments, contact may comprise touching of one or more of the bodies to the interior of an adjacent body. Contact may occur at a single point or at a plurality of points.

"Corrosion-resistant metal," as defined herein, refers to, for example, an electroplated metal which is less galvanically noble than a metal on to which the corrosion-resistant metal is electroplated. The term "corrosion-resistant metal" refers to, for example, any sacrificial or protective metal applied to prevent corrosion in a specific chemical environment. In various embodiments presented hereinbelow, corrosion-resistant metals protect and maintain functionality of electrical connectors.

In various embodiments presented hereinbelow, carbon nanotubes are referenced. In any of these various embodiments, carbon nanotubes may be formed by any known technique in any length, diameter and chirality. In any of these various embodiments, carbon nanotubes may exist in bundles of aggregated nanotubes or as debundled individual nanotubes. In any of the various embodiments, carbon nanotubes may be purified or unpurified. In any of the various embodiments, carbon nanotubes may be functionalized or unfunctionalized. In any of the various embodiments, the carbon nanotubes may have any number of concentric walls, including but not limited to, single-wall carbon nanotubes (SWNTs), double-wall carbon nanotubes (DWNTs), and multi-wall carbon nanotubes (MWNTs). SWNTs may have (n-m) chirality indices that provide metallic, semi-metallic or semiconducting forms. In any of the various embodiments, SWNTs may be physically or chemically separated to provide SWNTs in pure or highly-enriched metallic, semi-metallic or semi-conducting forms. In any of the various embodiments, carbon nanotubes may also be shortened, such as those obtained, for example, through oxidative reaction of carbon nanotubes in a mixture of nitric acid and fuming sulfuric acid (oleum). In any of the various embodiments, the carbon nanotubes may be functionalized with organic groups. A number of methods for functionalizing carbon nanotubes with a wide range of organic groups are well known to those of skill in the relative art. Functionalization of carbon nanotubes may occur on the ends of the carbon nanotubes, on the sidewalls of the carbon nanotubes, or a combination thereof.

In various embodiments presented hereinbelow, carbon nanotubes are dispersed in a polymer. The carbon nanotubes may be unbound to the polymer or covalently-bound to the polymer. When the carbon nanotubes are covalently bound to the polymer, the carbon nanotubes become an integral part of the polymer structure. Although certain embodiments presented hereinbelow are described using a particular type of carbon nanotube, such as a single-wall carbon nanotube, one skilled in the art will recognize, given the features and advantages of the disclosure, that various changes may be made to the carbon nanotubes for equivalent practice within the spirit and scope of the disclosure.

The present disclosure describes electrical connectors having standard electrical connections. Electrical conduction in the electrical connectors is provided by a polymer composite having carbon nanotubes dispersed in the polymer matrix. Various embodiments of the physical forms of the electrical connectors, fabrication methods, and design algorithms have been established and are presented hereinbelow.

Figure 1B:
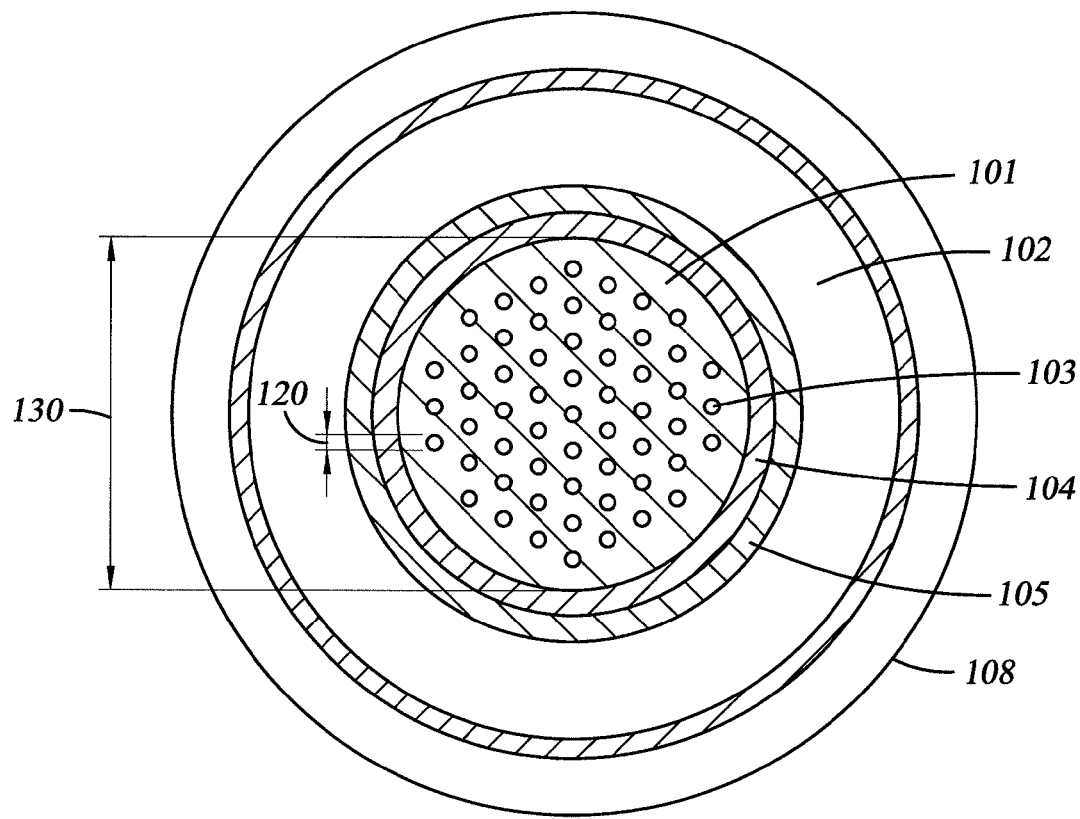

In various embodiments, electrical connectors are disclosed herein. The electrical connectors comprise at least one polymer, carbon nanotubes, and an electrical conductor comprising two electrical connection points. The carbon nanotubes are dispersed in the at least one polymer to form an electrically-conducting carbon nanotube/polymer dispersion. The electrical conductor comprises at least one metal. A first of the two electrical connection points contacts the carbon nanotube/polymer dispersion. A second of the two electrical connection points comprises a standard electrical connection. FIG. 1 presents an illustrative embodiment of such an electrical connector 100. The electrical connector has standard electrical connections 111. In FIG. 1, the standard electrical connection 111 is a plug. The electrical connector 100 includes an electrically-conducting carbon nanotube/polymer dispersion 101 and metallic electrical conductor 102. The electrically-conducting carbon nanotube/polymer dispersion 101 may be lined with shielding foil 104, insulation 105 or a combination thereof to confine, isolate and protect the electrically-conducting carbon nanotube/polymer dispersion 101. The metallic electrical conductor 102 further comprises a first electrical connection point 1021 and a second electrical connection point 1022. The first electrical connection point 1021 contacts the electrically-conducting carbon nanotube/polymer dispersion 101. The second electrical contact point 1022 comprises standard electrical connection 111. Illustrative standard electrical connections 111 include, for example, wires, blocks, sockets, plugs, pins, alligator clips, and circuits. Standard electrical connections 111 are advantageous for using the electrical connectors 100 in various applications, such as those integrating with existing electrical circuitry.

The electrical connectors 100 described herein are advantageous over ordinary electrical conductors, such as copper or aluminum wire. In ordinary electrical conductors, a high level of surface electron conduction is observed. This feature is known in the art as the skin effect. In contrast, the conduction electrons of the electrical connectors 100 are advantageously distributed throughout the entire volume of the electrically-conducting carbon nanotube/polymer dispersion 101 by the carbon nanotubes.

In various embodiments of the electrical connectors 100, the carbon nanotubes comprise single-wall carbon nanotubes. In various embodiments of the electrical connectors 100, the carbon nanotubes are functionalized. In various embodiments of the electrical connectors 100, the carbon nanotubes are at least partially aligned in the electrically-conducting carbon nanotube/polymer dispersion 101. Carbon nanotube alignment in the electrically-conducting carbon nanotube/polymer dispersion 101 may be accomplished by application of an electrical or magnetic field during initial dispersion of carbon nanotubes in the electrically-conducting carbon nanotube/polymer dispersion 101, during a connection of the metallic electrical conductor 102 to the electrically-conducting carbon nanotube/polymer dispersion 101, or both. As will be evident to one skilled in the art, carbon nanotube alignment beneficially enhances the electrical conductivity and mechanical properties of the electrically-conducting carbon nanotube/polymer dispersion 101 by taking advantage of the directional nature of carbon nanotube properties. Improved mechanical properties of the electrically-conducting carbon nanotube/polymer dispersion 101 may be advantageous for certain end uses of the electrical connectors.

Percolation theory predicts that there exists a percolation threshold concentration at which electrical conduction is established by a continuous carbon nanotube-to-carbon nanotube pathway. At the percolation threshold concentration, electrical conduction is established in an otherwise insulating material. In various embodiments of the electrical connectors 100, a weight percentage of carbon nanotubes in the electrically-conducting carbon nanotube/polymer dispersion 101 is above a percolation threshold concentration. The percolation threshold concentration is an intrinsic property of various carbon nanotube/polymer dispersions. The percolation threshold concentration varies, for example, on the polymer composition and the type of carbon nanotubes used.

In various embodiments of the electrical connectors 100, the metallic electrical conductor 102 comprises at least one metal. The at least one metal may include, for example, copper, aluminum, silver, gold and combinations thereof. The at least one metal may be essentially oxide free or be purified to become essentially oxide free to ensure a high level of conductance. At least a portion of the metallic electrical conductor 102 may be coated with a substance to improve corrosion resistance, leaving at least first electrical connection point 1021 and second electrical connection point 1022 uncoated. The corrosion-resistant substance provides cathodic corrosion protection, while also serving as a physical barrier between the metallic electrical conductor 102 and the environment. In various embodiments of the electrical connector 100, at least a portion of the metallic electrical connector 102 is electroplated with a metal providing corrosion resistance. For example, in various embodiments the metallic electrical conductor 102 comprises copper, which is electroplated, at least in part, with tin. Depending on the various metals used in constructing the metallic electrical conductor 102, one skilled in the art will recognize that any of a number of galvanically more active metals may be used for electroplating. For example, when the metallic electrical conductor 102 comprises copper, electroplating may also be conducted with nickel, chromium or zinc. Other methods such as, for example, flame metallization and hot dipping may be used to deposit the metal providing corrosion resistance. In various embodiments of the electrical connectors 100, the metallic electrical conductor 102 is coated with a corrosion-resistant layer that is not a metal. For example, the corrosion-resistant coating may include a polymer.

In some embodiments of the electrical connectors 100, the at least one metal may comprise $O_2$-free copper. As used in the electrical industry, $O_2$-free copper refers to a high-purity copper conductor having a very low concentration of copper oxides. Typically, $O_2$-free copper has been electrolytically refined to provide oxygen levels below about 0.001%. Various grades of $O_2$-free copper are specified by the ASTM database. For example, $O_2$-free electronic copper (C10100) is 99.99% pure copper with an oxygen content of less than 0.0005%. $O_2$-free copper (C10200) is 99.95% pure copper with an oxygen content of less than 0.001%. The electrical connectors 100 described herein may also be constructed from electrolytic-tough-pitch copper, which has a copper purity of 99.9% and an oxygen content of 0.02 to 0.4%.

The metallic electrical conductor 102 may be constructed as a casting or machined block with first electrical connection point 1021 and second electrical connection point 1022 built into cavities in the block. Second electrical connection point 1022 comprises a standard electrical connection 111. The standard electrical connection 111 is a female connection in some embodiments. For example, the standard electrical connection 111 may be a socket. The standard electrical connection 111 may be a male connection other embodiments. For example, the standard electrical connection 111 may be a plug. In the illustrative embodiment shown in FIG. 1, the second electrical connection point 1022 comprises a plug as the standard electrical connection 111. Standard electrical connection 111 may be attached to an existing electrical power source or standard electrical device when the electrical connector 100 is used in an application.

In various embodiments of the electrical connectors 100, the at least one polymer is selected from the group consisting of thermoplastic and thermosetting polymers. As discussed hereinbelow, the electrical conduction properties of the electrical connectors 100 are not especially dependent on the particular polymer selected. Therefore, the at least one polymer can be selected based on fabrication and mechanical operating requirements. In various embodiments of the electrical connectors 100, the at least one polymer is selected from the group consisting of polyethylene (PE), polypropylene (PP), polyetheretherketone (PEEK), polyetherketoneketone (PEKK), polyimide-imide (PAI), polyetherimide (PEI), polyurethane, polymethylmethacrylate, vinyl ester, epoxy, and combinations thereof.

Referring again to FIG. 1, it can be seen that the first electrical connection point 1021 contacts the electrically-conducting carbon nanotube/polymer dispersion 101. The first electrical connection point 1021 may comprise a flat surface or a raised shape. The raised shape may be regular or irregular and include a plurality of individual connection points. Since conducting electrons are distributed throughout the entire volume of the electrically-conducting carbon nanotube/polymer dispersion 101, rather than just residing on the outer surface as in ordinary conductors, it is advantageous to extend the electrical point of contact between electrically-conducting carbon nanotube/polymer dispersion 101 and metallic electrical conductor 102 beyond just a surface connection. In various embodiments of the electrical connectors 100, the first electrical connection point 1021 comprises a plurality of electrically-conducting pins 103. Each of the plurality of electrically-conducting pins 103 have a diameter 120. Each of the plurality of electrically-conducting pins 103 are embedded in the electrically-conducting carbon nanotube/polymer dispersion 101, which has a diameter 130. Each of the plurality of electrically-conducting pins 103 may penetrate the surface of the electrically-conducting carbon nanotube/polymer dispersion 101 and embed a distance 110 within the electrically-conducting carbon nanotube/polymer dispersion 101. Each of the plurality of electrically-conducting pins 103 may be cylindrical, oval, or prismatic. Prismatic pins may be, for example, trigonal, tetragonal, pentagonal, hexagonal, heptagonal, octagonal, nonagonal, or decagonal. The tips of the pins may be sharpened, hardened, chemically etched or a combination thereof to facilitate penetration of the electrically-conducting carbon nanotube/polymer dispersion 101. Sharpening, hardening, or chemical etching modifies the shape and composition of the pins to provide for efficient flow of polymer around the plurality of electrically-conducting pins 103. In certain embodiments of the electrical connectors 101, the plurality of electrically-conducting pins 103 have a triangular pitch to aid in penetrating the electrically-conducting carbon nanotube/polymer dispersion 101. A typical arrangement of the plurality of electrically-conducting pins 103 is characterized by equidistant spacing between pins, triangular pin pitch, and uniform penetration distance 110. The plurality of electrically conducting pins 103 is parallel to the direction in which at least a portion of the carbon nanotubes are aligned within the electrically-conducting carbon nanotube/polymer dispersion 101.

The plurality of electrically-conducting pins 103 can provide a much higher contact surface area between the first electrical connection point 1021 and the electrically-conducting carbon nanotube/polymer dispersion 101 than is achievable using a flat first electrical connection point 1021. For example, with a flat first electrical connection point 1021, the ratio of the contact surface area of the first electrical connection point 1021 to that of the electrically-conducting carbon nanotube/polymer dispersion 101 is unity (one). The ratio of the increase in surface area using a plurality of electrically-conducting pins 103 compared to a flat first electrical connection point 1021 may be calculated from the expression $$\frac{A_{pins}}{A_{polymer}} = \frac{Nd(d+4L)}{D^2}$$

where $A_{pins}/A_{polymer}$ is the ratio of surface area of the plurality of electrically-conducting pins 103 to that of a flat first electrical connection point 1021 surface, N is the number of pins, d is the pin diameter 120 (assuming round pins), L is the pin penetration depth distance 110, and D is the diameter 130 of the contact point of the electrically-conducting carbon nanotube/polymer dispersion 101 (assuming a round contact point). As will be evident to one skilled in the art, as N increases, the ratio $A_{pins}/A_{polymer}$ also increases, and once a certain number of pins is reached, the pin surface area becomes greater than that of a flat connection surface. The highest ratios of $A_{pins}/A_{polymer}$ are obtained when a large number N of pins having a small diameter 120 and long penetration depth 110 are utilized. The most easily fabricated pin diameters are dictated, for example, by standard American Wire Gauges that are commercially available. One skilled in the art will recognize, however, that custom pin diameters and lengths may be fabricated which are not limited by standard American Wire Gauges.

The number, arrangement, diameter, and length of the plurality of electrically-conducting pins 103 may be adjusted based on the contact area required for minimal voltage drop between the electrically-conducting carbon nanotube/polymer dispersion 101 and the first electrical connection point 1021. A design algorithm is presented in more detail hereinbelow, wherein physical properties of the carbon nanotubes and measured electrical properties of the electrically-conducting carbon nanotube/polymer dispersion 101 are used to determine various design parameters of the electrical connectors 100. The design algorithm is based on percolation theory. Consideration of design parameters of the electrical connectors 100 avoids a carbon nanotube breakdown voltage and self-heating of the electrically-conducting carbon nanotube/polymer dispersion 101 during operation of the electrical connectors 100 at specified voltages and current capacities. An operationally-insignificant voltage drop is obtained at the connection point between electrically-conducting carbon nanotube/polymer dispersion 101 and metallic electrical conductor 102 if the surface area of contact is sufficient. The optimal surface area of contact can be calculated and adjusted, for example, by modifying the length, diameter, and number of electrically-conducting pins 103. After the contact surface area between electrically-conducting carbon nanotube/polymer dispersion 101 and metallic electrical conductor 102 is calculated, a number of pins having penetration distance 110 is selected. In various embodiments of electrical connectors 100, a ratio of pin cross-sectional area (CSA) to carbon nanotube/polymer dispersion CSA is less than about 0.01. This CSA ratio is advantageous for providing smooth insertion of the plurality of electrically-conducting pins 103 into the electrically-conducting carbon nanotube/polymer dispersion 101. This CSA ratio further provides for a slightly larger diameter of metallic electrical conductor 102 than the electrically-conducting carbon nanotube/polymer dispersion 101. As such metallic electrical conductor 102 can be inserted over electrically-conducting carbon nanotube/polymer dispersion 101. Advantages of this design feature for constructing electrical connectors 100 are considered hereinbelow.

The plurality of electrically-conducting pins 103 comprising the first electrical connection point 1021 may be the same metal as the rest of the metallic electrical conductor 102. Alternately, the plurality of electrically-conducting pins 103 comprising the first electrical connection point 1021 may be a different metal than the rest of the electrical conductor 102. For example, the metallic electrical conductor 102 may be bimetallic. In various embodiments, the plurality of electrically-conducting pins 103 may comprise at least one metal selected from a group including copper, aluminum, gold, silver, and combinations thereof.

When the plurality of electrically-conducting pins 103 are inserted into the electrically-conducting carbon nanotube/polymer dispersion 101, the metallic electrical conductor 102 may be heated to soften the electrically-conducting carbon nanotube/polymer dispersion 101 and ease insertion of the pins. Alternately, the electrically-conducting carbon nanotube/polymer dispersion 101 may be heated directly to ease pin insertion. Electrical current may be supplied through the metallic electrical conductor 102 into electrically-conducting carbon nanotube/polymer dispersion 101 during pin insertion. Application of a current during pin insertion beneficially realigns carbon nanotubes displaced during polymer heating or pin insertion.

The plurality of electrically conducting pins 103 also provide mechanical strength to the connection point between the metallic electrical conductor 102 and the electrically-conducting carbon nanotube/polymer dispersion 101. When inserted into partially melted polymer of the electrically-conducting carbon nanotube/polymer dispersion 101, the plurality of pins 103 add strength to the connection point by creating an integrated phase transition zone from the electrically-conducting carbon nanotube/polymer dispersion 101 to the metallic electrical conductor 102.

In various embodiments of the electrical connectors 100, the metallic electrical conductor 102 and the electrically-conducting carbon nanotube/polymer dispersion 101 are secured together by a series of crimping operations. Referring again to FIG. 1, a compression ring 106 may be fitted over the insulation 105 of the electrically-conducting carbon nanotube/polymer dispersion 101 and crimped to the carbon nanotube/polymer dispersion 101 in a first crimping operation 1071. The compression ring 106 may comprise, for example, Cu/CuO. The compression ring 106 may have a roughened inner surface for added adhesion to the insulation 105. A second crimping operation 1072 may be performed between metallic electrical conductor 102 and electrically-conducting carbon nanotube/polymer dispersion 101. Second crimping operation 1072 includes crimping the end of the metallic electrical conductor 102 down to the diameter of compression ring 106, following the first crimping operation 1071. In various embodiments of the electrical connectors 100, the metallic electrical conductor 102 extends at least some distance beyond the compression ring 106 following the second crimping operation 1072. A third crimping operation 1073 and a fourth crimping operation 1074 are performed to crimp electrical conductor 102 to compression ring 106. A protective layer 108 may be added over the completed assembly of electrical connector 100 to provide electrical insulation, mechanical shock absorbance, and corrosion resistance. The protective layer 108 may be an insulating polymer, for example. The protective layer 108 may be applied, for example, by heat shrinking or dip coating methods.

The metallic electrical conductor 102 and electrically-conducting carbon nanotube/polymer dispersion 101 may be crimped together during assembly of a completed electrical connectors 100. In another embodiment, the metallic electrical conductor 102 may be connected in a field application to an electrical power source and then connected to the electrically-conducting carbon nanotube/polymer dispersion 101 through a series of crimping operations. For example, in field applications, one may cut the electrically-conducting carbon nanotube/polymer dispersion 101 with appropriate tools and then connect the metallic electrical conductor 102 by inserting the plurality of electrically-conducting pins 103 into the electrically-conducting carbon nanotube/polymer dispersion 101. Adjustment of polymer viscosity and carbon nanotube alignment by heating, applying a current, or a combination thereof may be accomplished in a field application rather than directly during manufacture.

Since the electrical connectors 100 described herein embody a new paradigm in electrical conduction, certain considerations are necessary in determining various electrical design parameters. For example, carbon nanotubes are conductive at current densities up to 100 times that of Cu and other metals. Unlike metals, carbon nanotubes do not exhibit electromigration. The resulting mismatch in current carrying capacity between carbon nanotubes and metallic electrical conductor 102 implies that the contact point between electrically-conducting carbon nanotube/polymer dispersion 101 and metallic electrical conductor 102 is ultimately limited by the current density of the chosen metal of the metallic electrical conductor 102. The plurality of electrically-conducting pins 103 from metallic electrical conductor 102 embedded into electrically-conducting carbon nanotube/polymer dispersion 101 beneficially allows a large contact surface area to be maintained. In this contact surface area, the cylindrical carbon nanotubes are generally oriented in parallel to the plurality of electrically-conducting pins 103. The calculated minimum and effective contact surface area between the plurality of electrically-conducting pins 103 and the electrically-conducting carbon nanotube/polymer dispersion 101 may be determined using an algorithm described in more detail hereinbelow. Due to contact imperfections, the minimum calculated contact surface area is incrementally increased by an amount after initial calculations to provide an effective contact surface area for constructing the electrical connector 100. Contact imperfections arise, for example, from the volume fraction of carbon nanotubes dispersed in the polymer, misalignment of carbon nanotubes in the polymer, and resistance caused by polymer trapped in a contact interface between the plurality of electrically-conducting pins 103 and the bulk electrically-conducting carbon nanotube/polymer dispersion 101.

Illustrative variables for determining the minimum and effective contact areas between metallic electrical conductor 102 and electrically-conducting carbon nanotube/polymer dispersion 101 include, for example, carbon nanotube type, carbon nanotube chirality, carbon nanotube diameter, carbon nanotube length, and a current density low enough to avoid self-heating. The calculated minimum contact surface area is then adjusted upward by the volume concentration of the carbon nanotubes in the polymer to yield an effective contact surface area. Further upward refinement of the contact surface area is then performed to account for carbon nanotube misalignment in the polymer dispersion, voltage drop due to trapped polymer at the contact interface, and current density limits relative to the volume of the plurality of electrically-conducting pins 103. A small degree of carbon nanotube misalignment may be beneficial in certain embodiments of the electrical connectors 100 in order to transfer current from carbon nanotube to carbon nanotube along a coherent pathway.

The conductivity of carbon nanotubes, particularly SWNTs, is thermo-electronic, rather than only electronic in nature. Application of a voltage across a carbon nanotube induces various vibrational modes leading to Joule self-heating of the carbon nanotube structure. Carbon nanotube electrical conductivity is strongly temperature dependent and can be described fundamentally by the temperature dependence of an electron charge carrier scattering with both acoustic and optical phonons. Phonons are quantized vibrations that carry thermal energy and alter electron equilibrium within the lattice of individual carbon nanotubes. Consequently, phonon behavior can affect many electron-dependent transport phenomena, including electrical conductivity.

Not intending to be bound by theory, it is presently understood that electrical conductivity in individual SWNTs occurs through single-electron charging and resonant tunneling through quantum energy levels of the carbon nanotube lattice. A sufficient concentration (at or above the percolation threshold concentration) of carbon nanotubes of the proper chiralities are utilized in the electrical connectors 100 described herein. For example, SWNTs having metal-like conduction have zero or very small band gaps based on their (n, m) chirality indices. Maximum conductivity of carbon nanotubes (minimal resistivity) allows the carbon nanotubes to approach the conductivity of conducting metals, such as Cu and Al.

A complete thermo-electronic model describing SWNT self-heating, electronic transport, and heat dissipation mechanisms has been described (E. Pop, D. Mann, K. E. Goodson, H. J. Dai, *J. Appl. Phys.* 2007:101 p. 093710). The findings of this work facilitate design criteria for the electrical connectors 100 described herein. First, the thermo-electronic model indicates that heating of SWNTs in the range of about 1 to about 10 μm in length can be limited by applying a design criterion of limiting overall power density in the electrical connectors 100. For example, at 5 μW/μm power density or less, Joule self-heating of these SWNTs does not exceed the capacity of heat dissipation of SWNT-SWNT, SWNT-polymer, or SWNT-metallic electrical conductor 102 contacts. Second, heat dissipation is limited by nanoscale flow path constriction at the SWNT-polymer interface rather than by the thermal conductivity of the polymer itself. This result implies that the specific polymer selected for the electrical connectors 100 influences electrical conductivity less than the geometry, concentration, and alignment of the SWNTs dispersed in the polymer.

In various embodiments, methods for constructing electrical connectors are disclosed. The methods comprise preparing a dispersion of carbon nanotubes in a polymer, preparing an electrical conductor comprising at least one metal, and connecting the electrical conductor and the dispersion of carbon nanotubes. The carbon nanotubes in the dispersion are at least partially aligned. The metallic electrical conductor comprises a first electrical connection point and a second electrical connection point. The first electrical connection point comprises a plurality of electrically-conducting pins. The second electrical connection point comprises a standard electrical connection. The connecting step comprises inserting the plurality of electrically-conducting pins into the dispersion of carbon nanotubes. Standard electrical connections have been considered in more detail hereinabove. In various embodiments of the methods, the carbon nanotubes comprise single-wall carbon nanotubes.

In various embodiments, the methods for constructing the electrical connectors further include heating the metallic electrical conductor comprising at least one metal during the connecting step. In various embodiments, the methods for constructing the electrical connectors further include heating the dispersion of carbon nanotubes during the connecting step. In various embodiments, the methods for constructing the electrical connectors further include applying an electrical current during the connecting step.

In various embodiments of the methods, the at least one metal of the electrical conductor may be selected, for example, from copper, aluminum, silver, gold and combinations thereof. One skilled in the will recognize that this listing of metals is illustrative in nature, and any of a number of conductive metals or alloys derived therefrom may be used to form the metallic electrical conductor. In various embodiments of the methods, the metallic electrical conductor is at least partially coated with a metal providing corrosion resistance. Properties of corrosion-resistant metals have been considered hereinabove. For example, the metallic electrical conductor may be formed from copper, which is essentially free of copper oxides, and then electroplated with tin. Other metals such as, for example, nickel, zinc or chromium may be used for electroplating tin. Methods for depositing the metal providing corrosion resistance are not limited to electroplating. For example, the metal providing corrosion resistance may be deposited by flame metallization or hot dipping. Non-metallic corrosion-resistant coatings may also be applied to the metallic electrical conductors in the various fabrication methods. For example, a polymer may be used to coat the metallic electrical conductor.

The methods for constructing the electrical connectors include a series of crimping operations to connect the metallic electrical conductor to the carbon nanotube dispersion. In various embodiments, the methods for constructing the electrical connectors further include crimping a compression ring to the dispersion of carbon nanotubes. The compression ring may have a roughened inner surface to provide a firm hold on the dispersion or insulation surrounding the dispersion. The compression ring provides a solid structural support for further crimping operations. In various embodiments, the methods for constructing the electrical connectors further include crimping the metallic electrical connector to the dispersion of carbon nanotubes and crimping the metallic electrical conductor to the compression ring. The crimping operations conducted in series beneficially provide for compartmentalized production and assembly of the electrical connectors. In various embodiments, the methods for constructing the electrical connectors further include coating a protective layer over the electrical connectors. For example, the protective layer may comprise an insulating polymer layer.

In various embodiments of the methods for constructing the electrical connectors, the standard electrical connection is a male connection. For example, the standard electrical connection may be a plug. In other various embodiments of the methods for constructing the electrical connectors, the standard electrical connection is a female connection. For example, the standard electrical connection may be a socket. The choice of the standard electrical connection will ultimately be dictated by the end use of the electrical connector.

In various embodiments of the methods for constructing the electrical connectors, the methods further comprise 1) determining a percolation threshold concentration for the dispersion of carbon nanotubes; 2) fitting a power law conductivity equation using the percolation threshold concentration; 3) specifying a voltage and current to be carried by the electrical connector; 4) specifying a length of the electrical connector; 5) calculating a length and a diameter of each of the plurality of electrically conducting pins; and 6) displaying a concentration of the carbon nanotubes in the dispersion of carbon nanotubes to achieve the voltage and the current to be carried by the electrical connector. In some embodiments, the input data, for example; percolation threshold concentration, voltage, current, and length; are manipulated to produce an output displayed and read by a human. For example, a human can utilize the displayed output results for constructing an electrical cable 100 having specified performance properties. In other embodiments, the input data are manipulated to produce an output displayed and read by machine. For example, the machine can automatically apply the input design parameters and output design parameters to construct an electrical cable 100 having specified performance properties.

In various embodiments, methods of transmitting electrical current are disclosed herein. The methods include providing an electrical connector described herein and connecting the electrical connector to a power source. The electrical connector may be assembled prior to connecting to the power source. Optionally, the metallic electrical conductor of the electrical connector may be first connected to the power source, and the electrically-conducting carbon nanotube/polymer dispersion is then attached to the metallic electrical conductor through the crimping operations described hereinabove. Thus, the electrical connectors provide for field assembly in various embodiments of transmitting electrical current.

EXPERIMENTAL EXAMPLES

The following experimental examples are included to demonstrate particular aspects of the present disclosure. It should be appreciated by those of skill in the art that the methods described in the examples that follow merely represent exemplary embodiments of the disclosure. Those of skill in the art should, in light of the present disclosure, appreciate that many changes can be made in the specific embodiments described and still obtain a like or similar result without departing from the spirit and scope of the present disclosure.

Example 1

Fabrication of an Electrical Connector in the Form of a Cable

An illustrative process by which an electrical connector described hereinabove was constructed in the form of an electrical cable follows. In the illustrative example described, the electrical cable was completely assembled during the manufacturing process.
1. Prepare a fiber comprising a carbon nanotubes/polymer dispersion 101 to a desired length and diameter.

2. Coat the fiber with layers of insulation 105 and shielding foil 104.
3. Cast a solid cylinder from conductor-grade Cu or other conductive metal for the main body of metallic electrical conductor 102.
4. Mill the surface of the casting and drill cavities for both the first electrical connection point 1021 and second electrical connection point 1022.
5. Electroplate Sn or other metal providing corrosion resistance on to the casting.
6. Drill holes for the plurality of electrically-conducting pins 103 into the flat face of the cavity on the first electrical contact point 1021 of the casting. The precise number and length of the pins is determined by applying an algorithm based on the conductivity of the carbon nanotube/polymer dispersion 101 described in a subsequent example hereinbelow.
7. Insert electrically-conducting pins into the drilled holes by compression fitting. Solder the pins at their bases where they contact the main body of the metallic electrical conductor 102.
8. Similarly to steps 6 and 7, drill holes into the flat face of the cavity on the second electrical contact point 1022 of the casting. Insert pins into the drilled holes by compression fitting. Solder the pins at their bases where they contact the main body of the metallic electrical conductor 102. These pins form a standard electrical connection plug. The number and arrangement of these pins is determined by the requirements of the electrical circuitry to which the electrical cable is being integrated.
9. Crimp compression ring 106 on to the fiber of electrically-conducting carbon nanotube/polymer dispersion 101, compressing the layers of insulation 105 and shield foil 104.
10. Heat the metallic electrical conductor 102 to a temperature sufficient to lower the viscosity of the electrically-conducting carbon nanotube/polymer dispersion 101. Optional preheating of the electrically-conducting carbon nanotube/polymer dispersion 101 may also be conducted, but the main heat source is supplied by metallic electrical conductor 102. The heat flux, temperature ramp, and temperature hold time are determined by the viscoelastic properties of the electrically-conducting carbon nanotube/polymer dispersion 101.
11. Join the hot metallic electrical conductor 102 to the electrically-conducting carbon nanotube/polymer dispersion 101 by forced insertion of the plurality of electrically-conducting pins 103 into the flat end face of the electrically-conducting carbon nanotube/polymer dispersion 101. Polymer flows around the inserted pins to provide integral contact between 101 and 103.
12. Apply electric current through the metallic electrical conductor 102 into the cable formed during pin insertion. Application of an electrical current realigns any carbon nanotubes displaced during polymer heating and pin insertion.
13. Crimp the connecting end of the metallic electrical conductor 102 down to the diameter of the compression ring 106.
14. Crimp the end of the metallic electrical conductor 102 to the compression ring 106 in two places. The compression ring 106 is slightly harder than the metallic electrical conductor 102 to provide a tight crimp joint without crushing the compression ring 106.
15. Place an insulating polymer sheath over the completed assembly and apply external, convective heat to shrink the sheath. The insulating polymer sheath also adds support around the compression ring 106. Optionally, the insulating polymer sheath may be applied by dip-coating application.

Example 2

Evaluation of Electrical and Thermal Properties in a SWNT/Polymer Dispersion

The electrical and thermal behavior of SWNTs in a polymer dispersion were evaluated via the use of a two-point resistivity test fixture. Resistivity measurements on a polymer system containing various types, chiralities, and concentrations of carbon nanotubes influence various design parameters beneficial for constructing the electrical connectors. Percolation theory predicts that there is a percolation threshold concentration at which a continuous carbon nanotube-to-carbon nanotube pathway is formed, thus providing electrical conduction in an otherwise insulating material. Identification of the percolation threshold establishes a design parameter for the electrical connector.

The electrical connector design includes an iterative algorithm using a percolation equation, which is derived from experimental data, to confirm that the carbon nanotube concentration initially chosen will deliver a required electrical connector power load at a limiting current density. The design algorithm utilizes a near-comprehensive battery of electrically-conducting carbon nanotube/polymer dispersion physical properties in determining various construction parameters of the electrical connectors. For example, the design algorithm includes carbon nanotube thermo-electronic properties, carbon nanotube geometry, carbon nanotube-to-carbon nanotube contact resistances, carbon nanotube-polymer interactions, and carbon nanotube-metallic electrical conductor 102 contact resistances. The various data from real electrically-conducting carbon nanotube/polymer dispersions 101 are utilized to optimize various electrical connector 100 construction parameters. Variability in construction of the electrical connectors 100 is minimized by evaluating electrically-conducting carbon nanotube/polymer dispersion 101 properties placed into each assembled electrical connector 100.

A generalized method by which electrical characterization of an electrically-conducting SWNT/polymer dispersion was accomplished and the design algorithm was subsequently applied follows:
1. Specify voltage and current for the SWNT/polymer dispersion and the metallic electrical conductor.
2. Specify the overall length of the SWNT/polymer dispersion.
3. Assign initial estimate of SWNT concentration in the polymer dispersion. This concentration was estimated by examining experimental conductivity versus concentration data for the selected SWNT/polymer dispersion.
4. Characterize the SWNTs according to the chiralities present and then calculate a number average SWNT diameter, d. Characterization may be accomplished, for example, by Raman, fluorescence and UV-VIS spectroscopic methods. Use structural analysis to calculate the SWNT density or use 0.89 g/cm$^3$ as a default value.
5. Characterize SWNTs to determine an average length, L.
6. Define a design current density for SWNTs to avoid self-heating under an applied voltage. Use a maximum value of about 5 µW/µm for SWNTs of about 1 µm to about 10 µm in length.
7. Calculate the minimum number of SWNTs predicted to handle the specified electrical load at the design current density.

8. Assess the quality of SWNT alignment gained by exposure to an electric or magnetic field. Assign a "misalignment fraction" representing the proportion of SWNTs that are not parallel or approximately parallel to a longitudinal axis of the electrical connector. Approximately parallel, as defined herein, refers to a misalignment from parallel of not more than about 10 degrees.
9. Calculate the number of SWNTs predicted to conduct current to the plurality of electrically-conducting pins 103.
10. Calculate the cross-sectional area (CSA) and longitudinal contact area of an individual SWNT. For longitudinal contact area, use A=L×d as an approximation.
11. Calculate the predicted sidewall contact area between SWNTs and the plurality of electrically-conducting pins 103 by multiplying the predicted number of SWNTs by the longitudinal contact area per SWNT. Use the predicted sidewall contact area as the initial pin surface area.
12. Convert SWNT weight concentration to volume concentration and adjust the pin surface area upward to ensure that the pins encounter the required number of SWNTs when inserted into the SWNT/polymer dispersion. Because the SWNT/polymer dispersion and individual SWNTs are both cylindrical, the cross-sectional area fraction of SWNTs in the polymer is proportional to the volume fraction of SWNTs.
13. Define the number and length of the plurality of electrically-conducting pins 103 so that the pin surface area equals the previously calculated contact surface area.
14. Increment the number and penetration length of the plurality of electrically-conducting pins 103 so that a ratio of pin CSA to the SWNT/polymer dispersion CSA is less than or equal to about 0.01.
15. Calculate current density through the calculated CSA of the plurality of electrically-conducting pins 103. Convert CSA to diameter and American Wire Gauge (AWG). Confirm that calculated current density is within the allowable range for the metallic electrical conductor.
16. Calculate the total conductor diameter and CSA, including the plurality of electrically-conducting pins 103 plus SWNT/polymer dispersion. Determine the total resistivity and conductivity of the SWNT/polymer dispersion. Substitute the conductivity value into the previously derived percolation equation, and back-calculate the required SWNT concentration. If the result does not agree with the initial SWNT concentration specified for the design, then iterate the initial concentration and repeat all steps of the design algorithm until the percolation concentration agrees with the starting assumption.

Example 3

Application of Design Algorithm

In the Example that follows, an electrical connector constructed as a cable is described. The cable was specified for having a nominal 120 V DC (or V AC), 30 A, 3600 W SWNT-polymer conductor. The SWNT/polymer dispersion was 100 ft long. The SWNTs were manufactured by Southwest Nano-Technologies, Inc. (SWeNT) as Commercial Grade (CG) material and dispersed in a urethane-methacrylate polymer. Dispersion was accomplished using methods known in the art to provide sufficiently uniform polymer dispersions of carbon nanotubes.

Figure 2:
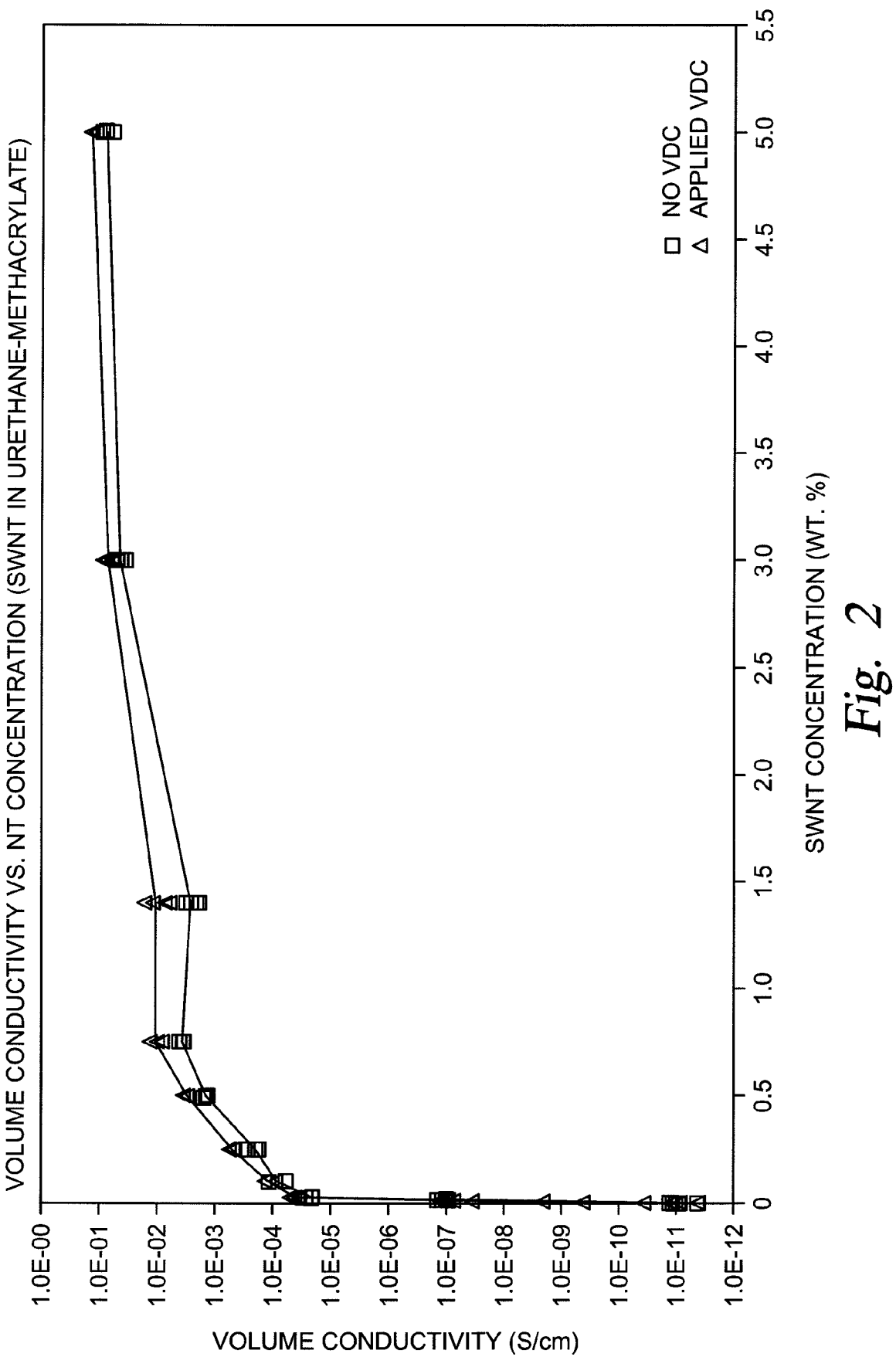
FIG. 2 illustrates a plot of volume conductivity versus SWNT concentration in a urethane-methacrylate polymer, as measured both in the presence and absence of an applied voltage.

Multiple small specimens of SWNTs in urethane-methacrylate were first prepared to measure volume resistivity of the SWNT/polymer dispersion. SWNT concentration was incrementally varied from 0.0025 wt. % to 5.0 wt. %, and the SWNT/polymer dispersion was placed in an electrically insulating mold of uniform cross-section following processing. Cu test leads were added to each end of the SWNT/polymer dispersion. During curing of the polymer, a DC voltage (0-600 V DC) was applied to the SWNT/polymer dispersion to induce an electric field and enhance alignment of the SWNTs. Voltage was applied using a constant hold, linear ramp, or cyclical sweep. The electrical (Ohmic) resistance of each sample was measured both with and without applied V DC using various multimeters capable of covering a range of $1.0 \times 10^{-8} \Omega$ to $2.1 \times 10^{14} \Omega$. Raw resistance measurements were converted into volume resistivity values and then into conductivity values. These volume conductivity results were then plotted vs. SWNT concentration as shown in FIG. 2, both in the presence and absence of an applied voltage. At each concentration, the application of a voltage increased the conductivity of the SWNT/polymer dispersion. This effect highlights the utility of applying a voltage when connecting the SWNT/polymer dispersion and metallic electrical conductor.

Figure 3:
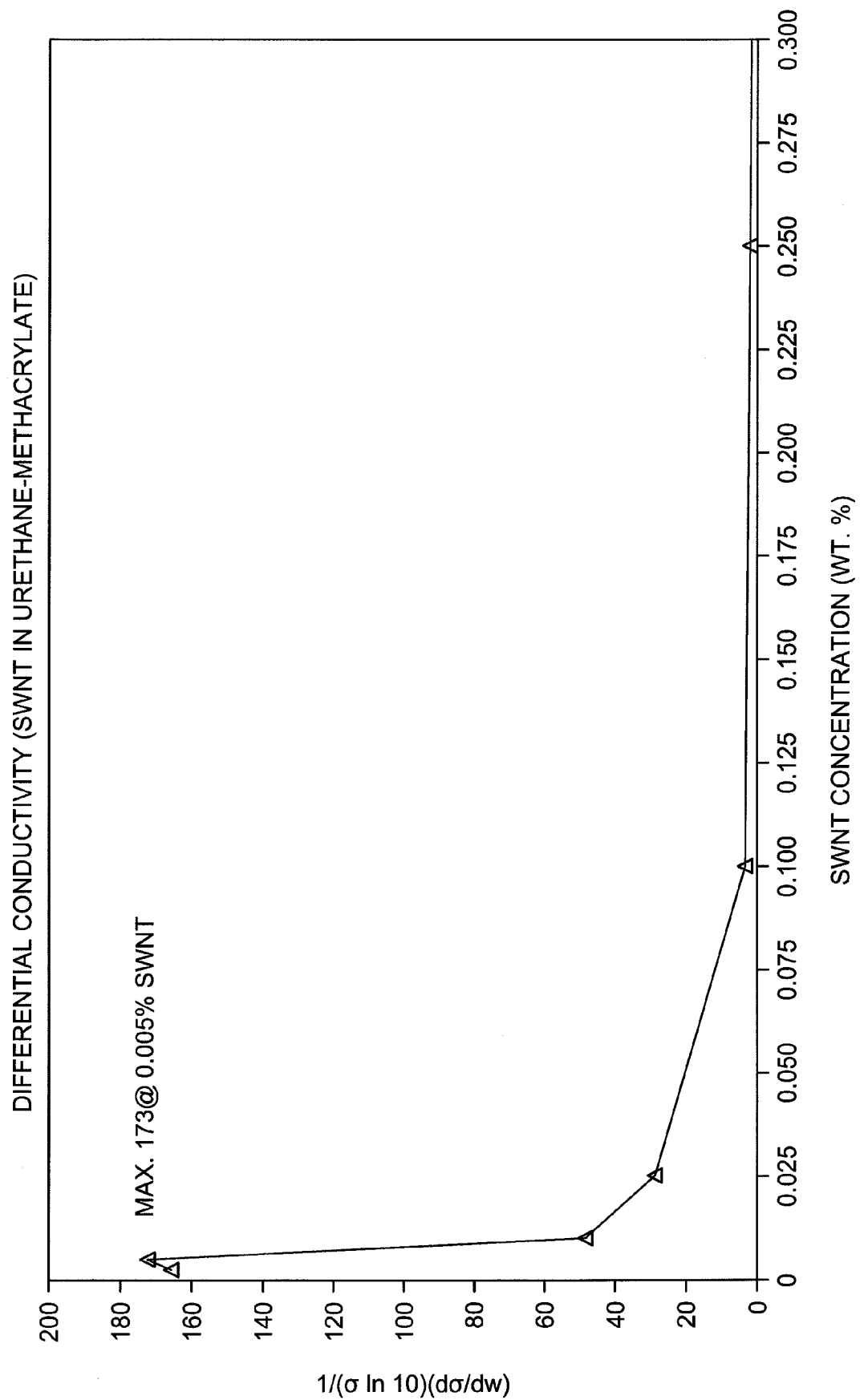
FIG. 3 illustrates a first derivative plot of volume conductivity versus SWNT concentration in a urethane-methacrylate polymer for measurements made in the presence of an applied voltage.
Figure 4:
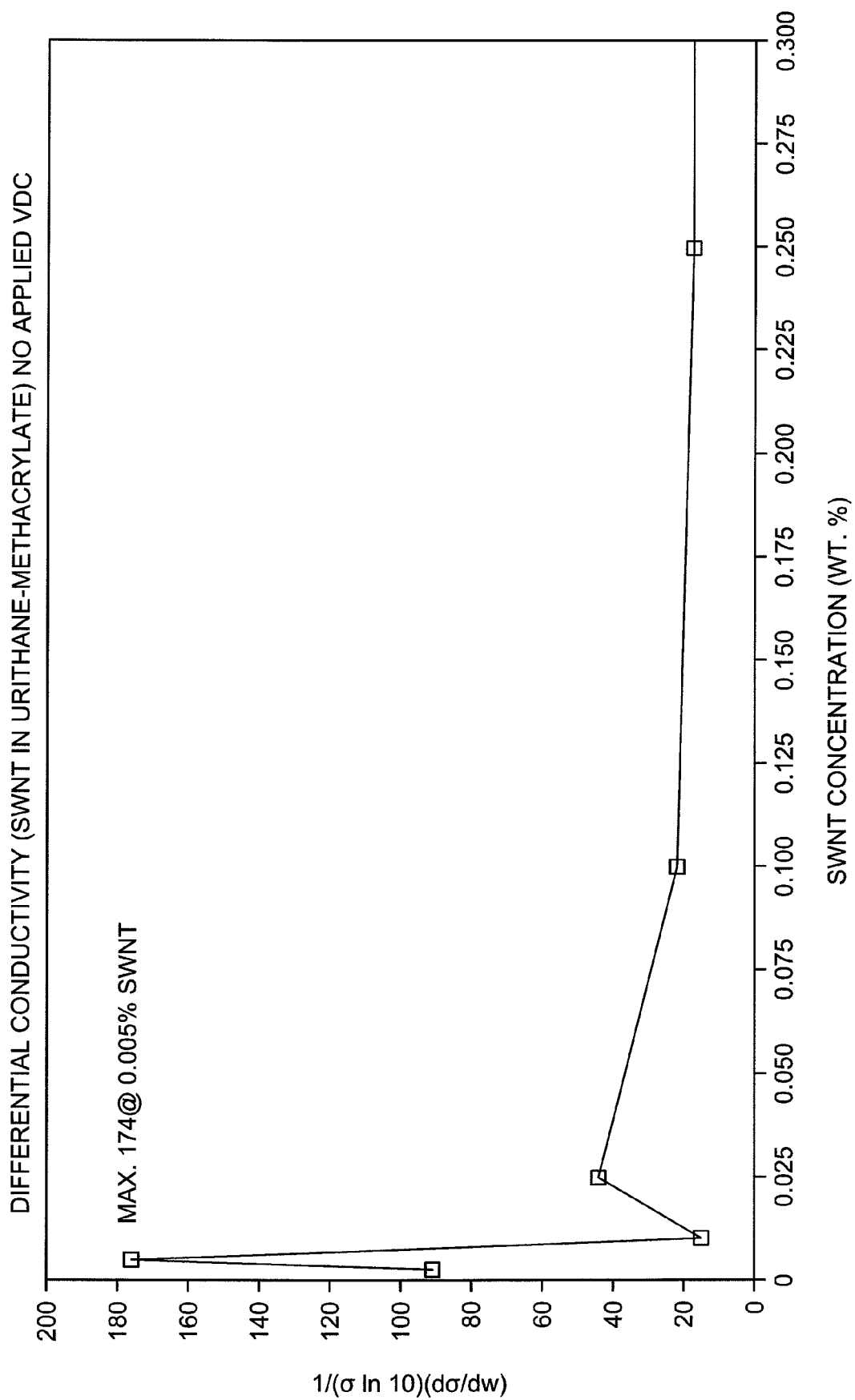
FIG. 4 illustrates a first derivative plot of volume conductivity versus SWNT concentration in a urethane-methacrylate polymer for measurements made in the absence of an applied voltage.

A first derivative plot of the volume conductivity versus SWNT concentration plot was then prepared as shown in FIGS. 3 and 4, respectively, for measurements made in the presence and absence of an applied voltage. The maximum values of the first derivative plots represent the percolation threshold concentration for the SWNT-urethane-methacrylate polymer dispersion. Concentrations greater than the percolation threshold concentration increased conductivity, but by an incrementally smaller amount.

The percolation threshold represents the aggregate effect of carbon nanotube type, size, extent of dispersion, and physico-chemical interactions with the polymer matrix. As indicated in FIGS. 3 and 4, the first derivative of conductivity reached a maximum at 0.005 wt. % SWNT, both in the presence and absence of an applied voltage. The 0.005 wt. % percolation threshold is a defined property representative of the particular SWNT/polymer dispersion, and the percolation threshold is altered if either the type of carbon nanotubes or the polymer is changed. After the particular percolation threshold was established, the conductivity data was fitted to a power law in terms of the weight percentage of SWNTs:

$$\sigma = A(w - w_c)^t$$

Figure 5:
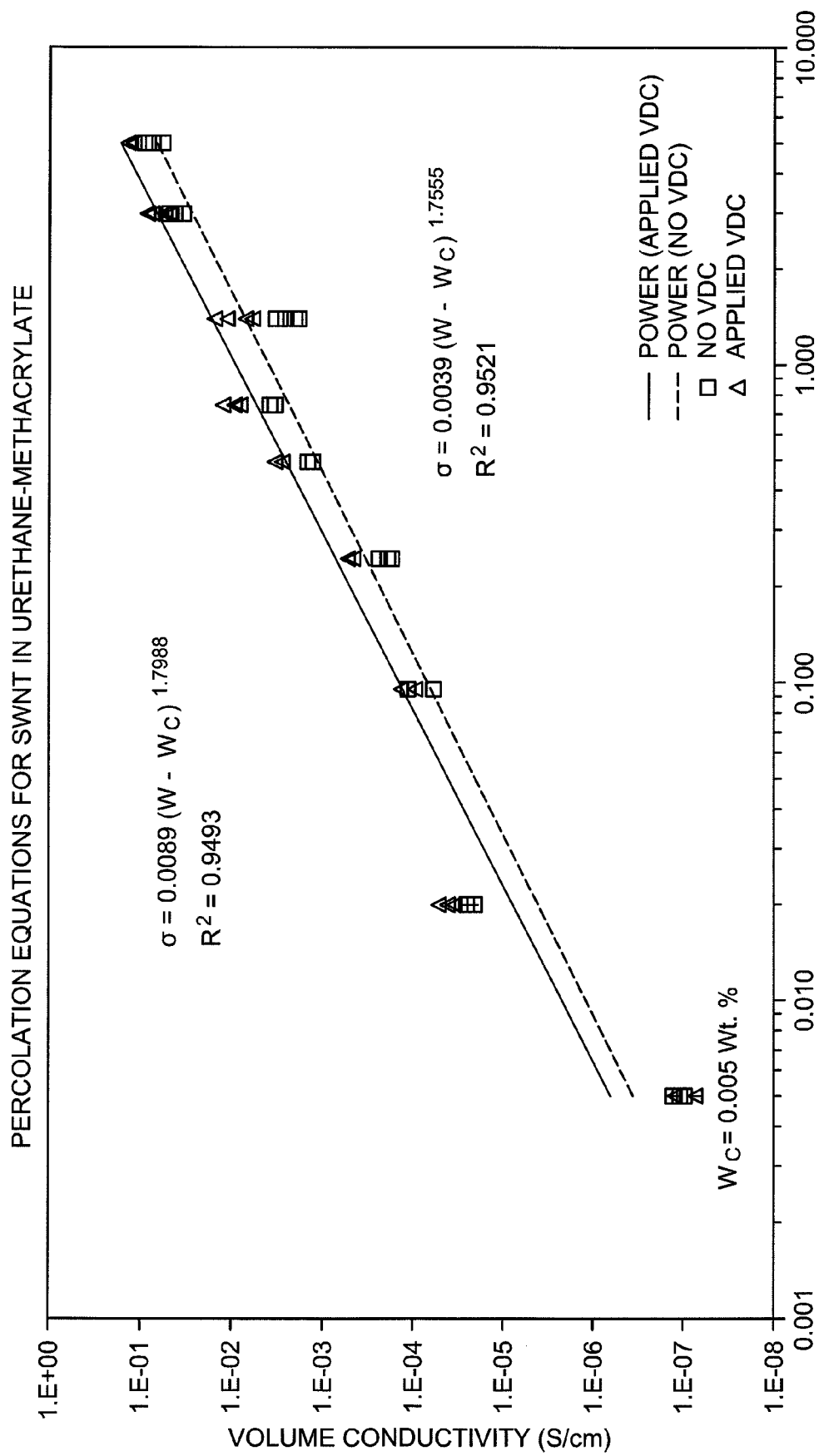
FIG. 5 illustrates a plot of volume conductivity versus the logarithm of (SWNT wt. %-percolation threshold wt. %) in the presence and absence of an applied voltage.

In the power law equation, w is the total SWNT wt. %, $w_c$ is the percolation threshold wt. %, and A and t are fitted constants. To obtain the power law constants, the logarithm of $(w-w_c)$ was calculated and plotted against the original volume conductivity data displayed in FIG. 2. The plot of volume conductivity versus the logarithm of $(w-w_c)$ is shown in FIG. 5. Fitting the data shown in FIG. 5 produced constants of A=0.0089 and t=1.7988 for applied voltage and A=0.0039 and t=1.7555 in the absence of an applied voltage.

The percolation equations for SWeNT CG SWNT in urethane-methacrylate polymer provide a characterization of intrinsic electrical properties vs. concentration, as well as the sensitivity of these properties to process conditions (SWNT dispersion methods, polymer curing technique, applied voltage, etc.) The percolation equations were used to extrapolate the SWNT concentration predicted to achieve a target conductivity, for example, a conductivity approaching a conductive metal, such as Cu. The predicted SWNT concentration should represent physical reality and not exceed certain mechanical limitations. For example, the calculated SWNT concentration to achieve a target conductivity cannot be greater than 100%. Further, the calculated SWNT concentration should not be greater than the weight percentage that the particular polymer matrix can accommodate while maintaining mechanical integrity. A concentration greater than 100% or greater than the polymer's capacity to maintain mechanical integrity indicates that the SWNTs are inadequate for specified conductivity. Any combination of SWNT and polymer matrix for which a percolation equation has been derived, and for which physically achievable SWNT concentrations may be realized, can be used in conjunction with the electrical connectors.

After the percolation equations were defined, the electrical design method was applied to configure the electrical cable specified above (100 ft of SWNT/polymer dispersion and 3600 W power capacity). The SWeNT CG SWNT concentration in urethane-methacrylate was initially specified as 5.0 wt. %. An exemplary spreadsheet used for inputting and calculating various electrical connector construction parameters is shown in FIG. 6. Parameters requiring input are indicated with darkened cells.

The calculations presented in FIG. 6 indicated that electrical connector should have two pins, each 1 cm long and formed from 28 AWG Cu wire. The calculated current density through the pins was 119 A/cm$^2$, which is much less than the 969 A/cm$^2$ allowable for 28 AWG Cu wire. These pins would penetrate a SWNT/polymer dispersion that is 5.7 mm in diameter. The calculated SWNT concentration required was an impossible 1179%, indicating that the selected SWNTs are inadequate to conduct 3600 W of power, even though the connector is otherwise properly sized to handle the design criteria.

Example 4

Application of Design Algorithm in a Physically-Realistic Electrically-Conducting Cable This Example describes a cable design in which the initial design specifications were within the intrinsic electrical conduction capacity of SWeNT CG SWNTs. An exemplary spreadsheet used for inputting and calculating various electrical connector construction parameters is shown in FIG. 7. The cable specified in FIG. 7 showed suitability for use in applications having a capacity of 100 V and 0.2 A, or 22 W of power. A single pin penetrating 0.635 cm into a 7.62 cm SWNT/urethane-methacrylate polymer dispersion was utilized for percolation threshold concentration testing. The SWNT concentration in urethane-methacrylate was 4.9 wt. % SWeNT CG SWNTs. Unlike Example 3, which did not represent physical reality, this embodiment of the electrical connector was designed to match the conductivity of SWeNT CG SWNT at a defined concentration. After setting an initial SWNT concentration of 5.0 wt. %, all design parameters were calculated. The input concentration was then iterated until the SWNT concentration output of the algorithm matched the specification. The model converged at a concentration of 4.9 wt. % SWNT and a SWNT/polymer dispersion diameter of 3.4 mm. Calculated resistivity for the electrical connector described was 6.42 Ω·m versus an actual measured value of 7.54Ω·m obtained when the electrical cable was constructed and tested.

Example 5

Application of Design Algorithm for Common Voltages and Currents

Figure 9:
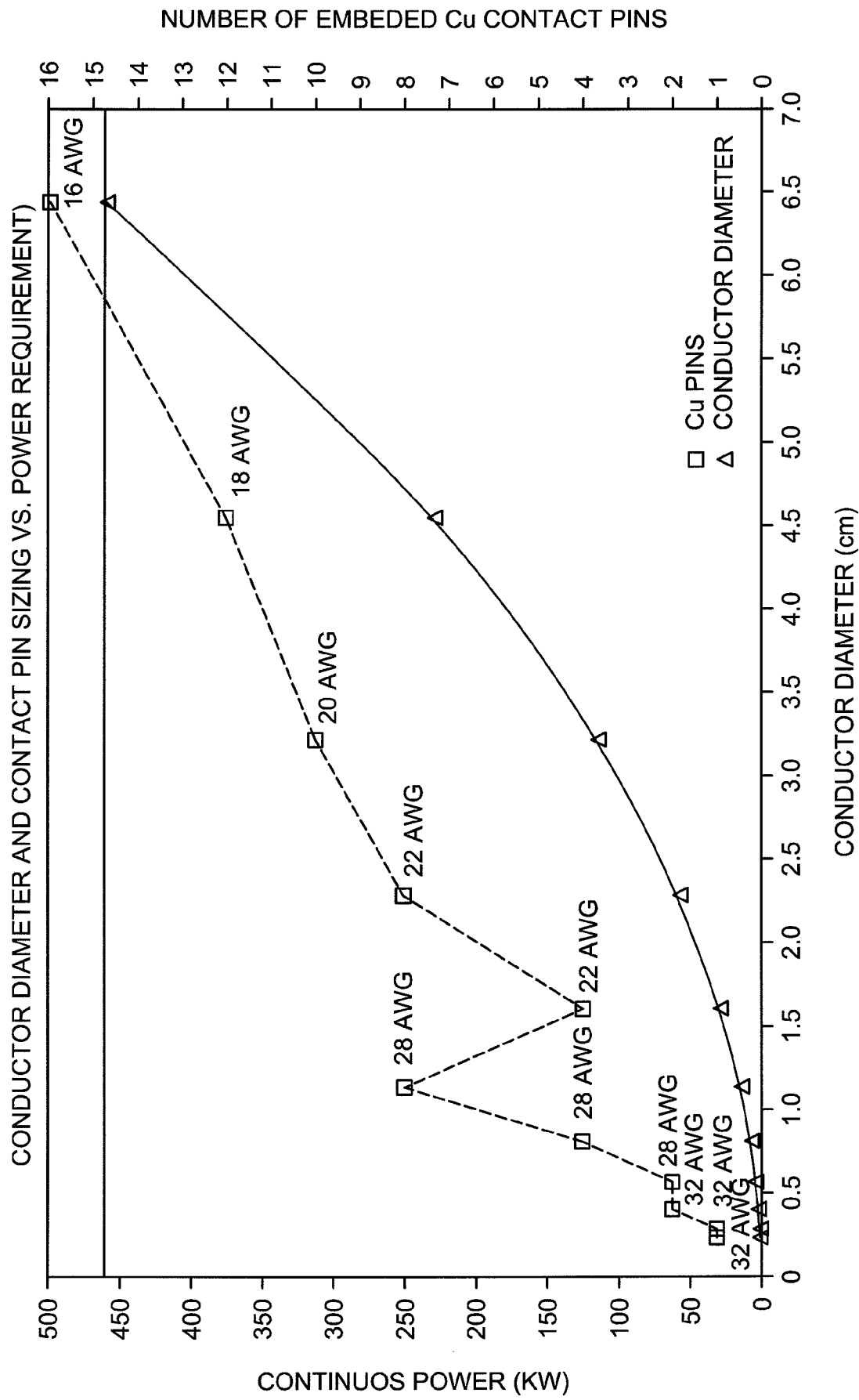
FIG. 9 illustrates a plot of carbon nanotube/polymer dispersion diameter and pin sizing versus power requirements of various electrical connectors.

The design algorithm was applied to provide electrical connectors compatible with several common voltages and currents applicable to AC and DC power. A listing of various design parameters is specified in FIG. 8. A relationship between polymer dispersion sizing and the number and gauge of pins relative to power capacity of these common voltages and currents is shown in FIG. 9.

From the foregoing description, one skilled in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is:

1. An electrical connector comprising:
   at least one polymer;
   carbon nanotubes;
      wherein the carbon nanotubes are dispersed in the at least one polymer to form an electrically-conducting carbon nanotube/polymer dispersion; and
   an electrical conductor comprising two electrical connection points;
      wherein the electrical conductor comprises at least one metal;
      wherein a first of the two electrical connection points contacts the carbon nanotube/polymer dispersion; and
      wherein the electrical conductor is configured for transmitting current therethrough between the carbon nanotube/polymer dispersion and a second of the two electrical connection points.

2. The electrical connector of claim 1, wherein the carbon nanotubes comprise single-wall carbon nanotubes.

3. The electrical connector of claim 1, wherein the carbon nanotubes are at least partially aligned.

4. The electrical connector of claim 1, wherein the at least one polymer is selected from the group consisting of thermoplastic and thermosetting polymers.

5. The electrical connector of claim 1, wherein the at least one polymer is selected from the group consisting of polyethylene, polypropylene, polyetheretherketone, polyetherketoneketone, polyamide-imide, polyetherimide, polyurethane, polymethylmethacrylate, vinyl ester, epoxy, and combinations thereof.

6. The electrical connector of claim 1, wherein the second connection point comprises a female connection.

7. The electrical connector of claim 1, wherein the second connection point comprises a male connection.

8. The electrical connector of claim 1, wherein the first electrical connection point comprises a plurality of electrically conducting pins.

9. A method for transmitting electric current comprising:
   providing the electrical connector of claim 1; and
   connecting the electrical connector to a power source.

10. The electrical connector of claim 1, wherein the at least one metal is selected from the group consisting of copper, aluminum, silver, gold and combinations thereof.

11. The electrical connector of claim 10, wherein at least a portion of the electrical conductor is electroplated with a metal providing corrosion resistance.

12. The electrical connector of claim 11, wherein the at least one metal comprises copper and the metal providing corrosion resistance comprises tin.

13. An electrical connector comprising:
    at least one polymer;
    carbon nanotubes;

wherein the carbon nanotubes are dispersed in the at least one polymer to form an electrically-conducting carbon nanotube/polymer dispersion; and an electrical conductor comprising two electrical connection points;

wherein the electrical conductor comprises at least one metal;

wherein a first of the two electrical connection points contacts the carbon nanotube/polymer dispersion;

wherein a second of the two electrical connection points comprises an electrical connection; and wherein a weight percentage of carbon nanotubes in the electrically-conducting carbon nanotube/polymer dispersion is above a percolation threshold concentration.

14. An electrical connector comprising:
at least one polymer;
carbon nanotubes;
wherein the carbon nanotubes are dispersed in the at least one polymer to form an electrically-conducting carbon nanotube/polymer dispersion; and an electrical conductor comprising two electrical connection points;

wherein the electrical conductor comprises at least one metal;

wherein a first of the two electrical connection points contacts the carbon nanotube/polymer dispersion;

wherein a second of the two electrical connection points comprises an electrical connection; and wherein the electrically-conducting carbon nanotube/polymer dispersion and the electrical conductor are secured together by a series of crimping operations.

15. The electrical connector of claim 1, wherein the carbon nanotubes are functionalized.

\* \* \* \* \*